(12) United States Patent
Breedvelt-Schouten et al.

(10) Patent No.: US 9,836,444 B2
(45) Date of Patent: Dec. 5, 2017

(54) SPREAD CELL VALUE VISUALIZATION

(71) Applicant: International Business Machines Corporation, Armonk, NY (US)

(72) Inventors: Ilse M. Breedvelt-Schouten, Manotick (CA); Michael Du Plessis, Ottawa (CA); Alireza Pourshahid, Ottawa (CA); Maria Gabriela Sanches, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/965,056

(22) Filed: Dec. 10, 2015

(65) Prior Publication Data

US 2017/0169005 A1   Jun. 15, 2017

(51) Int. Cl.
*G06F 17/00* (2006.01)
*G06F 17/24* (2006.01)

(52) U.S. Cl.
CPC .......... *G06F 17/246* (2013.01); *G06F 17/247* (2013.01)

(58) Field of Classification Search
CPC ..... G06F 17/245; G06F 17/246; G06F 17/247
USPC ................. 715/212, 219–220, 227
See application file for complete search history.

(56) References Cited

U.S. PATENT DOCUMENTS

| | | | | |
|---|---|---|---|---|
| 5,416,895 A | * | 5/1995 | Anderson | G06F 3/0481 715/209 |
| 5,461,708 A | * | 10/1995 | Kahn | G06T 11/206 345/440 |
| 5,634,133 A | * | 5/1997 | Kelley | G06T 11/206 345/440 |
| 6,362,829 B1 | * | 3/2002 | Omvik | G06T 11/001 345/440 |
| 6,429,869 B1 | * | 8/2002 | Kamakura | G06F 3/04847 345/440 |
| 6,532,462 B2 | * | 3/2003 | Balaban | C12Q 1/6809 |
| 2002/0085039 A1 | * | 7/2002 | Blower, Jr. | G06F 3/033 715/776 |
| 2002/0091994 A1 | * | 7/2002 | McCready | G06Q 10/04 717/124 |
| 2005/0010862 A1 | * | 1/2005 | Bauchot | G06F 17/245 715/220 |
| 2009/0177293 A1 | * | 7/2009 | Reginald | G06Q 30/0283 700/36 |

(Continued)

OTHER PUBLICATIONS

Kankuzi et al., An End-User Oriented Graph-Based Visualization for Spreadsheet, ACM 2008, pp. 86-90.*

(Continued)

*Primary Examiner* — Cong-Lac Huynh
(74) *Attorney, Agent, or Firm* — Gilbert Harmon, Jr.

(57) ABSTRACT

As disclosed herein, a method for visualizing a spread function corresponding to a data table includes receiving a set of user selected cells selected by a user that correspond to a data table, enabling the user to select a spread command from a set of available spread commands, executing the selected spread command on the set of user selected cells to provide a set of adjusted cells, displaying an interactive visualization to the user corresponding to the set of adjusted cells, and providing a data table corresponding to the set of adjusted cells. A computer program product and computer system corresponding to the method are also disclosed.

17 Claims, 4 Drawing Sheets

(56) References Cited

U.S. PATENT DOCUMENTS

| | | | |
|---|---|---|---|
| 2009/0204548 A1* | 8/2009 | Swearingen | G06Q 40/00 705/36 R |
| 2012/0109711 A1* | 5/2012 | Boe | G06Q 30/02 705/7.31 |
| 2012/0311475 A1* | 12/2012 | Wong | G06F 11/3003 715/772 |
| 2013/0104071 A1* | 4/2013 | Boutoussov | G06F 19/3406 715/781 |
| 2013/0145244 A1 | 6/2013 | Rothschiller et al. | |
| 2013/0201207 A1* | 8/2013 | Bryant | H04N 1/407 345/600 |
| 2014/0019899 A1 | 1/2014 | Cheng et al. | |
| 2014/0149836 A1* | 5/2014 | Bedard | G06F 17/2247 715/212 |
| 2014/0149839 A1* | 5/2014 | Bedard | G06F 17/246 715/220 |
| 2014/0189482 A1* | 7/2014 | Hill | G06F 3/04883 715/212 |
| 2014/0201128 A1* | 7/2014 | Barber | G06F 17/30398 707/600 |
| 2014/0280153 A1* | 9/2014 | Cronin | G06F 17/30539 707/737 |
| 2014/0372850 A1* | 12/2014 | Campbell | G06F 17/246 715/212 |
| 2014/0372851 A1 | 12/2014 | Rutherford et al. | |
| 2015/0026554 A1* | 1/2015 | Hogan | G06F 3/04883 715/212 |
| 2016/0091467 A1* | 3/2016 | Morris | G01N 30/8675 73/23.37 |
| 2016/0209379 A9* | 7/2016 | Morris | G01N 30/8675 |
| 2016/0224536 A1* | 8/2016 | Thomas | G06F 17/246 |
| 2016/0253982 A1* | 9/2016 | Cheung | G06F 3/0484 |
| 2016/0364420 A1* | 12/2016 | Cronin | G06F 17/30539 |
| 2017/0017988 A1* | 1/2017 | Goenka | G06Q 30/0244 |
| 2017/0039179 A1* | 2/2017 | Gur | G06F 17/00 |

OTHER PUBLICATIONS

IBM Knowledge Center, "Cognos Insight 10.2.0", printed on Sep. 30, 2015, 1 page, <http://www-01.ibm.com/support/knowledgecenter/SSVJ22_10.2.0/com.ibm.swg.ba.cognos.dsk_ug.10.2.1.doc/c_dsk_anlz_dataspreading.html%23UsingDataSpreading_N60007?lang=en>.

IBM, "IBM Cognos Insight v10.2.1: Spread data", Published on Oct. 29, 2013, Copyright 2013 IBM Corporation, pp. 1-3, <https://www.youtube.com/watch?v=I0ctacE2sHA>.

"About the Dimension Spread Method dialog", Prophix 11 SP4, Copyright © 2005-2015 Prophix Software Inc., printed on Sep. 30, 2015, 1 page, <http://documentation.prophix.com/p11help/en/Content/spreading/dimension_spread_method_dialog.htm>.

* cited by examiner

SPREAD CELL VALUE VISUALIZATION

BACKGROUND OF THE INVENTION

The present invention relates generally to the field of performance management, and more specifically to applying spread functions within performance management applications.

In performance management applications, users can enter data values into a grid or data table for planning purposes. Entering these values manually can be cumbersome, as there may be many data values to enter. One way to minimize the amount of manual input required is to enable spread (or spreading) commands. These commands may enable a user to apply a rule or function to a group of data values at once.

SUMMARY

As disclosed herein, a method for visualizing a spread function corresponding to a data table includes receiving a set of user selected cells selected by a user that correspond to a data table, enabling the user to select a spread command from a set of available spread commands, executing the selected spread command on the set of user selected cells to provide a set of adjusted cells, displaying an interactive visualization to the user corresponding to the set of adjusted cells, and providing a data table corresponding to the set of adjusted cells. A computer program product and computer system corresponding to the method are also disclosed.

DETAILED DESCRIPTION

Currently existing spreading techniques are defined in an abstract manner. In some cases, the functions have obscure names and are only defined or explained in the documentation. Additionally, the gestures to determine what values can be chosen are defined within a dialog, obscuring the view of the data. Further yet, the existing solutions are not optimized for touch interfaces. The method disclosed herein may enable spread commands to be easily utilized via both touch interfaces and standard interfaces, while also providing visualization of the effects of a spread command.

Figure 1:
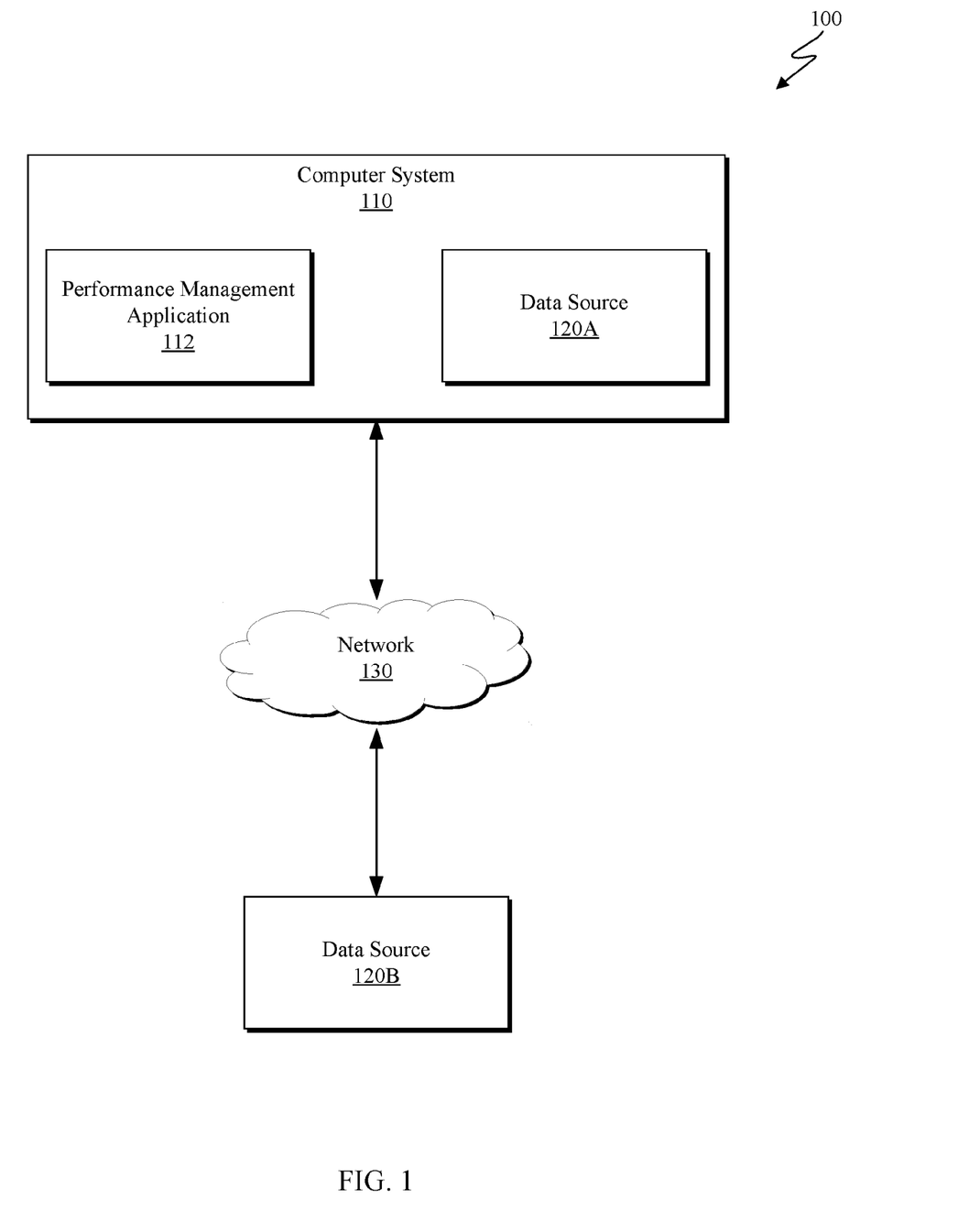
FIG. 1 is a block diagram depicting one embodiment of a performance management system in accordance with some embodiments of the present invention.

FIG. 1 is a block diagram depicting one embodiment of a performance management system 100 in accordance with some embodiments of the present invention. As depicted, performance management system 100 includes a computer system 110, a data source 120, and a network 130. Performance management system 100 may correspond to a system in which an interactive spreading visualization method may be utilized.

Computer system 110 can be a desktop computer, laptop computer, tablet computer, specialized computer server, or any other computer system known in the art. In some embodiments, computer system 110 represents a computer system utilizing clustered computers and components to act as a single pool of seamless resources when accessed through network 130. In general, computer system 110 is representative of any electronic devices, or combination of electronic devices, capable of executing machine-readable program instructions, as described in greater detail with respect to FIG. 4.

As depicted, computer system 110 may include a performance management application 112 and a data source 120B. Performance management application 112 may be any application in which a user can enter data values into cells within a grid. Performance management application 112 may correspond to any data table software known in the art. Performance management application 112 may be populated with data via user input. In some embodiments, performance management application 112 may be configured to be populated with data from data sources 120.

Data sources 120 may be any source whose data is processed and represented via performance management application 112. As depicted, a data source may be hosted on computer system 110, such as data source 120A, or can be content hosted elsewhere and accessed via network 130, such as data source 120B.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between computer system 110 and data source 120B in accordance with an embodiment of the present invention.

Figure 2:
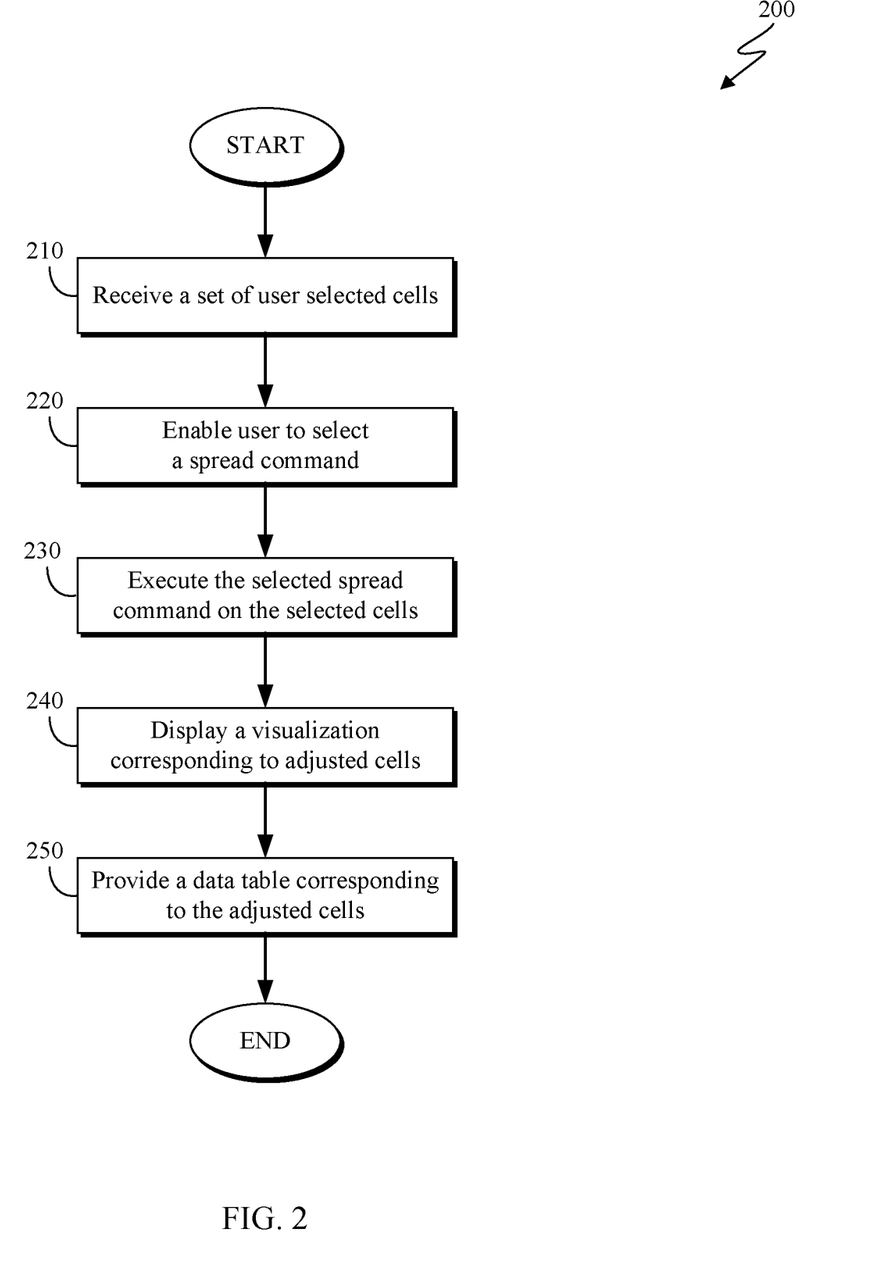
FIG. 2 is a flowchart depicting one embodiment of an interactive spreading visualization method in accordance with some embodiments of the present invention.

FIG. 2 is a flowchart depicting one embodiment of an interactive spreading visualization method 200 in accordance with some embodiments of the present invention. As depicted, interactive spreading visualization method 200 includes receiving (210) a set of user selected cells, enabling (220) a user to select a spread command, executing (230) the selected spread command to provide a set of adjusted cells, displaying (240) a visualization corresponding to the set of adjusted cells, and providing (250) a data table corresponding to the adjusted cells. Spreading visualization method 200 may enable a user to utilize spread functions without data-obscuring dialog on top of a data table.

Receiving (210) a set of user selected cells may include receiving a user indication of which entries within a data table a selected spread command will be applied to. In one embodiment, the user indicates selected cells by selecting the cells using a cursor. In other embodiments, the user indicates selected cells by touching the selected cells on a touchscreen interface. Receiving (210) a set of user selected cells may additionally include highlighting or otherwise differentiating the selected cells from other cells on a display. In one embodiment, receiving (210) a set of user selected cells includes displaying arrows around a selected cell, enabling the user to select an entire row or column of cells corresponding to the selected cell. For example, when the user selects a cell, arrows pointing left, up, right, and down from the selected cell may appear, and selecting one of these arrows will cause a spread command to be applied to cells within the same row or column as the selected cell in the selected direction. A user may also be able to select cells via standard cell selection methods, such as by highlighting the selected cells with a cursor or by using a cursor in conjunction with a key command to select multiple items. Receiving (210) a set of user selected cells may additionally include highlighting or otherwise differentiating the selected cells from other cells on a display.

Enabling (220) a user to select a spread command may include displaying a series of available spread commands to a user. One example of a spread command is to enter a single value which will be entered in any cells to which the spread command will apply. Another example would be to increase the existing values in each cell by a certain percentage. The user may indicate an appropriate spread command by selecting the command, with a cursor, from a set of commands displayed in a context menu. In other embodiments, the user selects the appropriate command by interacting with the context menu on a touch screen.

The set of commands may correspond to a variety of spread commands, which may include a proportional spread command, an equal spread command, a repeat command, a clear command, a percent change command, a straight line command, or a growth percent command. A proportional spread command distributes a specified value among cells proportional to existing cell values. An equal spread command distributes a specified value equally across the cells in a view. A repeat spread command repeats a specified value across cells in a view. A clear command replaces values in cells in a view with "0". A percent change command multiplies current cell values by a specified percentage. A straight line command interpolates a straight line between a value in a first selected cell and a value in a last selected cell, and adjusts cell values in between such that the cell values create a straight line. A growth percent command takes an initial cell value as a starting point and increments all values in a selected range of cells by a specified growth percentage.

Executing (230) the spread command may include applying the selected spread command to the set of user selected cells as indicated by the user. In a case where a user indicates a value to populate the set of selected cells with, executing (230) the spread command comprises replacing any existing values in the cells with the value indicated by the user. In the case where a user indicates a percentage by which to increase the values, then the values in the selected cells are increased by the indicated percentage. For example, if a user selects three cells containing the values "100", "200", and "300", and selects a spread function to increase the values by 20%, then the three cells will be edited to contain the values "120", "240", and "360", respectively.

Displaying (240) an interactive visualization corresponding to the set of user selected cells may include utilizing visualization techniques available within a performance management application to produce a visualization of the selected cells after they have been altered by the spread function. In one embodiment, displaying (240) a visualization corresponding to the selected cells may include producing a graph depicting how the values corresponding to the selected cells have changed. Many performance management applications have embedded graphing capabilities used to create graphs from data in specified cells. Displaying (240) a visualization may comprise utilizing these graphing capabilities by providing the user selected cells as the data to be graphed. The visualization may be displayed on the data table without obscuring the selected cells.

In some embodiments, the generated visualization may also include a mechanism for adjusting the spread function. Based on the visualization of the adjusted cells, a user may want to change the spread function being applied. The visualization may include a sliding scale allowing the user to adjust the scale of the spread function. That is, if a user had initially requested each value be increased by 20%, the slider would enable the user to increase or decrease this amount.

Adjusting the percentage in the slider would update the value within the spread command, and would produce an updated visualization corresponding to the new value. An example of this mechanism is discussed with respect to FIG. 3.

Providing (260) a data table corresponding to the adjusted cells may include finalizing a data table with respect to the cells altered by the spread function. In one embodiment, a user may be provided an option to finalize the values. The user may select a yes or no option via a graphical user interface. Once the user has elected to finalize the data change, the visualization and associated graphics may be removed from display, and a data table corresponding to the adjusted cells may be displayed.

Figure 3:
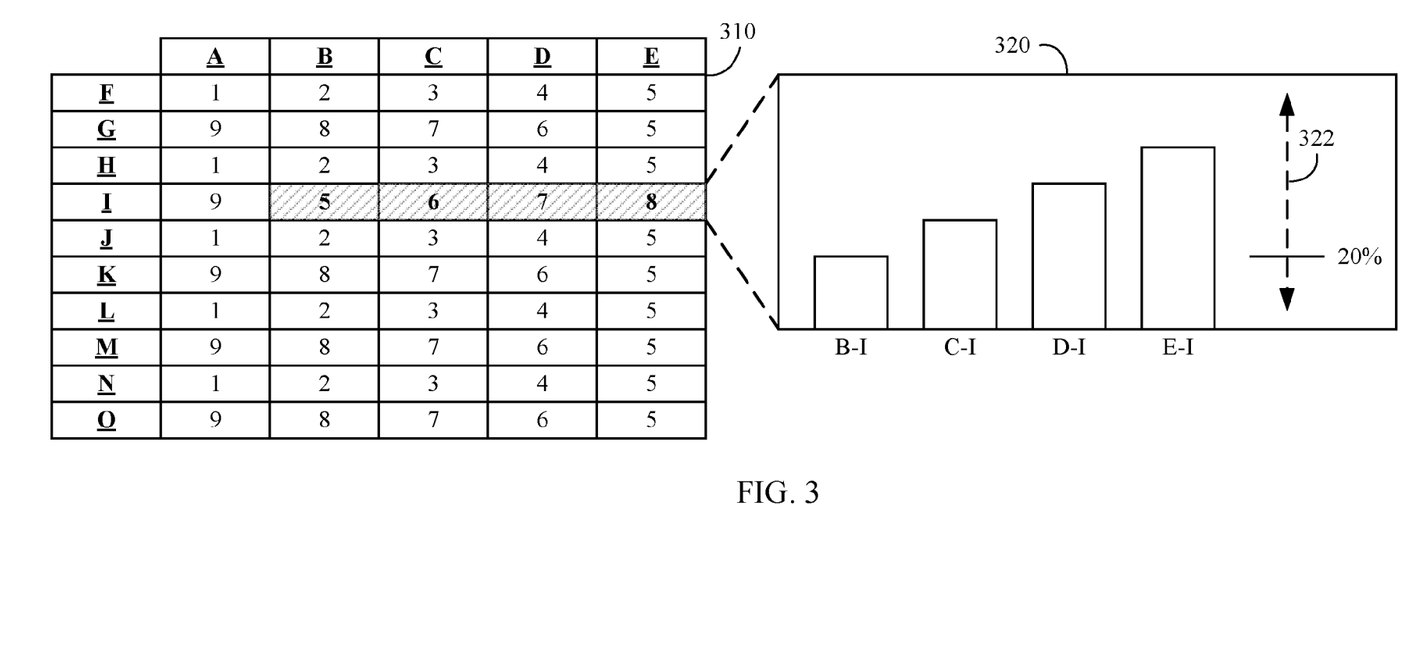
FIG. 3 depicts an example data table visualization in accordance with one embodiment of the present invention.

FIG. 3 depicts an example data table visualization 320 of a data table 310 in accordance with one embodiment of the present invention. As depicted, the data table 310 includes 5 columns, labeled A-E, and 10 rows, labeled F-O. Data table 310 is an example of a data table whose data may be edited and visualized via an interactive spreading visualization method. In the example depicted with respect to FIG. 3, cells B-I, C-I, D-I, and E-I (wherein cell B-I corresponds to the cell in column B, row I) have been selected by a user. In addition, the user has selected a spread function that increases the values of the selected cells by 20%.

Interactive spreading visualization 320 is a graph depicting how the values in the selected cells change in response to the spreading function. As depicted, the interactive spreading visualization 320 includes representations corresponding to each selected cell, as well as a slider 322. As discussed previously, slider 322 may enable the user to increase or decrease the percentage by which the values in the selected cells are altered. Moving the slider upwards using either a cursor or a gesture on a touch screen would cause the spread function to be adjusted to increase the values by greater than 20%, while moving the slider downwards would cause the spread function to be adjusted to increase the values by less than 20%. The data table 310 may include more rows and columns of data than are depicted, and in a case where the selected values are in the middle of the data table, the corresponding visualization may appear over the top of data that is not being actively manipulated.

Figure 4:
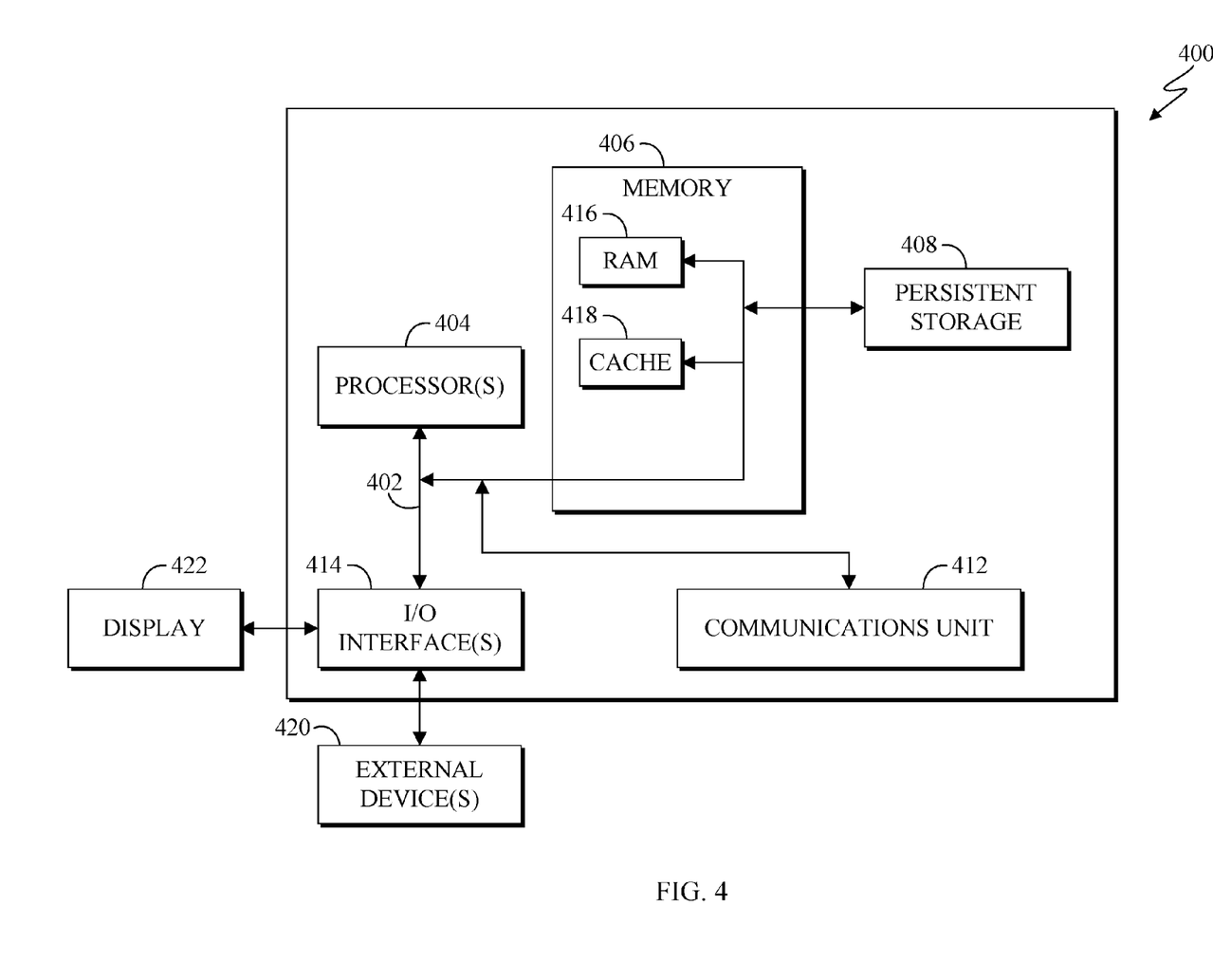
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   enabling a user to select a set of user selected cells that correspond to a data table;
   enabling the user to select a spread command from the set of available spread commands;
   executing the selected spread command on the set of user selected cells to alter the values in the selected cells;
   displaying an interactive visualization including a graph and a slider to the user, wherein the graph corresponds to the set of selected cells altered by the selected spread command, and the slider is to adjust cell values corresponding to the displayed graph;
   responsive to detecting an interaction with the interactive visualization, adjusting the interactive visualization and a selected spread command executed on the set of cells corresponding to the displayed graph according to the detected interaction to provide a set of adjusted cells;
   providing a data table corresponding to the set of adjusted cells.

2. The method of claim 1, wherein enabling the user to select a spread command comprises providing a graphical user interface through which the user can select the spread command.

3. The method of claim 1, wherein the set of available spread commands includes a proportional spread command, an equal spread command, a repeat command, a clear command, a percent change command, a straight line command, and a growth percentage command.

4. The method of claim 1, wherein the displayed graph depicts the set of selected cells both before and after the spread command is executed.

5. The method of claim 1, wherein executing the selected spread command comprises executing a function indicated by the selected spread command on one or more values corresponding to the set of user selected cells.

6. The method of claim 1, further comprising providing a user interface to enable the user to adjust the executed spread function based on the visualization.

7. A computer program product comprising:
   one or more computer readable storage media and program instructions stored on the one or more computer readable storage media, the program instructions comprising instructions to:
   enable a user to select a set of user selected cells that correspond to a data table;
   enable the user to select a spread command from the set of available spread commands;
   execute the selected spread command on the set of user selected cells to alter the values in the selected cells;
   display an interactive visualization including a graph and a slider to the user, wherein the graph corresponds to the set of selected cells altered by the selected spread command, and the slider is to adjust cell values corresponding to the displayed graph;
   responsive to detecting an interaction with the interactive visualization, adjust the interactive visualization and a selected spread command executed on the set of cells corresponding to the displayed graph according to the detected interaction to provide a set of adjusted cells;
   provide a data table corresponding to the set of adjusted cells.

8. The computer program product of claim 7, wherein instructions to enable the user to select a spread command comprise instructions to provide a graphical user interface through which the user can select the spread command.

9. The computer program product of claim 7, wherein the set of available spread commands includes a proportional spread command, an equal spread command, a repeat command, a clear command, a percent change command, a straight line command, and a growth percentage command.

10. The computer program product of claim 7, wherein the displayed graph depicts the set of selected cells both before and after the spread command is executed.

11. The computer program product of claim 7, wherein instructions to execute the selected spread command comprise instructions to execute a function indicated by the selected spread command on one or more values corresponding to the set of user selected cells.

12. The computer program product of claim 7, further comprising instructions to provide a user interface to enable the user to adjust the executed spread function based on the visualization.

13. A computer system comprising:
one or more computer processors;
one or more computer-readable storage media storing program instructions for execution by at least one of the one or more processors, the program instructions comprising instructions to:
enable a user to select a set of user selected cells that correspond to a data table;
enable the user to select a spread command from the set of available spread commands;
execute the selected spread command on the set of user selected cells to alter the values in the selected cells;
display an interactive visualization including a graph and a slider to the user, wherein the graph corresponds to the set of selected cells altered by the selected spread command, and the slider is to adjust cell values corresponding to the displayed graph;
responsive to detecting an interaction with the interactive visualization, adjust the interactive visualization and a selected spread command executed on the set of cells corresponding to the displayed graph according to the detected interaction to provide a set of adjusted cells;
provide a data table corresponding to the set of adjusted cells.

14. The computer system of claim 13, wherein instructions to enable the user to select a spread command comprise instructions to provide a graphical user interface through which the user can select the spread command.

15. The computer system of claim 13, wherein the set of available spread commands includes a proportional spread command, an equal spread command, a repeat command, a clear command, a percent change command, a straight line command, and a growth percentage command.

16. The computer system of claim 13, wherein instructions to execute the selected spread command comprise instructions to execute a function indicated by the selected spread command on one or more values corresponding to the set of user selected cells to provide the set of selected cells.

17. The computer system of claim 13, further comprising instructions to provide a user interface to enable the user to adjust the executed spread function based on the visualization.

* * * * *